United States Patent
Sevindik et al.

(10) Patent No.: US 9,674,837 B1
(45) Date of Patent: Jun. 6, 2017

(54) COORDINATED MULTIPOINT BASED AIR-INTERFACE RESOURCE SCHEDULING

(71) Applicant: Sprint Spectrum LP, Overland Park, KS (US)

(72) Inventors: Volkan Sevindik, Fairfax, VA (US); Yu Zhou, Herndon, VA (US); Muhammad Ahsan Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 190 days.

(21) Appl. No.: 14/591,383

(22) Filed: Jan. 7, 2015

(51) Int. Cl.
  *H04W 4/00* (2009.01)
  *H04W 72/04* (2009.01)
  *H04L 5/00* (2006.01)
  *H04W 72/08* (2009.01)
  *H04W 72/10* (2009.01)

(52) U.S. Cl.
  CPC ....... *H04W 72/0446* (2013.01); *H04L 5/0035* (2013.01); *H04W 72/085* (2013.01); *H04W 72/10* (2013.01)

(58) Field of Classification Search
  USPC .......... 370/230–315, 329–252; 455/512–522
  See application file for complete search history.

(56) References Cited

U.S. PATENT DOCUMENTS

| 8,787,192 | B2* | 7/2014 | Lee | ........................ | H04W 48/02 370/230 |
| 2010/0022184 | A1* | 1/2010 | Khoshnevis | ......... | H04B 7/2606 455/7 |
| 2012/0129560 | A1* | 5/2012 | Lunden | ................. | H04W 72/10 455/512 |
| 2013/0016648 | A1* | 1/2013 | Koskela | ................ | H04W 92/20 370/315 |
| 2013/0272170 | A1 | 10/2013 | Chatterjee et al. | | |
| 2015/0031408 | A1* | 1/2015 | Kalla | .................... | H04W 52/38 455/522 |
| 2015/0103773 | A1* | 4/2015 | Pedersen | .......... | H04W 72/0426 370/329 |

FOREIGN PATENT DOCUMENTS

WO    2014071553 A1    5/2014

* cited by examiner

*Primary Examiner* — Man Phan

(57) ABSTRACT

Using a first access node, a set of wireless devices are communicated with using a first frame configuration. The communication using the first frame configuration meets a first throughput threshold criteria for both a first and second subsets of the wireless devices A second frame configuration having a second ratio of uplink subframes to downlink subframes is selected. Based on the selection of the second frame configuration, a second access node is used concurrently with the first access node to communicate with the second subset of wireless devices using the second frame configuration.

16 Claims, 6 Drawing Sheets

COORDINATED MULTIPOINT BASED AIR-INTERFACE RESOURCE SCHEDULING

TECHNICAL BACKGROUND

Telecommunication systems, such as cellular networks or other wireless networks, use various network links throughout the network to communicate. For example, different frame configurations may be implemented on network links depending upon the network topology. Further, multiple access nodes may establish communication links to devices to improve overall performance.

In certain wireless network deployments, subframes may be configured to carry uplink or downlink traffic. The number of subframes allocated to either uplink or downlink traffic can be changed in order to meet the demands of the traffic in the network. However, when the allocation of subframes changes, the uplink and downlink coverage area may also change. Thus, wireless devices that are in a coverage area for a given subframe allocation may not be covered when the subframe allocation is changed.

OVERVIEW

In an embodiment, a method of operating a communication system includes scheduling air-interface resources among wireless devices based on a priority that is determined by a nonlinear function of signal quality indicators. These signal quality indicators are associated with the wireless devices. The wireless devices may be divided into a first set and a second set. The first set of wireless devices meet a throughput threshold criteria when both a first frame configuration and a second frame configuration are used. The second set of wireless devices do not meet the throughput threshold criteria when the second frame configuration is used. The nonlinear function gives lower priority to the first set. The nonlinear function gives higher priority to the second set of wireless devices. Using a first access node, the plurality of wireless devices are communicated with using the first frame configuration. Using the first access node and a second access node, the second set of wireless devices are communicated with using the second frame configuration.

In an embodiment, a method of operating a communication system includes selecting a first frame configuration having a first ratio of uplink subframes to downlink subframes. Using a first access node, a set of wireless devices are communicated with using the first frame configuration. This set of wireless devices includes a first subset of wireless devices and a second subset of wireless devices. The communication using the first frame configuration meets a first throughput threshold criteria for both the first subset of wireless devices and the second subset of wireless devices. A second frame configuration having a second ratio of uplink subframes to downlink subframes is selected. Using the first access node, the set of wireless devices are communicated with using the second frame configuration. This communication using the second frame configuration meets the first throughput threshold criteria for the first subset of wireless devices, but does not meet the first throughput threshold criteria for the second subset of wireless devices. Based on the selection of the second frame configuration, a second access node is used concurrently with the first access node to communicate with the second subset of wireless devices using the second frame configuration.

In an embodiment, a communication system comprises a plurality of wireless devices including a first set of wireless devices and a second set of wireless devices. A first access node is configured to communicate with the plurality of wireless devices using a first frame configuration and a second frame configuration. Communication between the second set of wireless devices to the first access node not meeting a first throughput threshold criteria when the second frame configuration is used. A second access node is configured to communicate with the second set of wireless devices concurrently with the first access node when the second frame configuration is used.

DETAILED DESCRIPTION

In an embodiment, a wireless communication system changes uplink/downlink frame configurations to adapt to changes in uplink/downlink traffic patterns. These changes alter the ratio of uplink subframes to downlink subframes in a frame. Reducing the allocation of uplink subframes can reduce the uplink throughput of some of the wireless devices (particularly those near the edge of a coverage area) to below a desired minimum. In other words, changing the ratio of uplink subframes to downlink subframes can cause some of the served wireless devices to lose and regain coverage having the desired minimum throughput. This can cause the user of a wireless device to experience quality of service issues.

In an embodiment, a nonlinear function of received reference signal power (RSRP—or some other signal quality indicator) is used in making air-interface scheduling decisions. This nonlinear function is designed to improve the average uplink throughput experienced by wireless devices regardless of frequent changes in coverage caused by repeatedly changing the frame configuration. In other words, the nonlinear function is designed to give wireless devices that are constantly losing and regaining coverage a higher priority (when they have coverage) than wireless devices that maintain constant coverage. In this manner, the wireless devices whose coverage is intermittent due to the frame configuration changes are able to get more air-interface resources when they have coverage—thereby increasing the average uplink throughput they experience (as compared with having equal priority to constant coverage wireless devices).

In addition, in an embodiment, when a wireless device loses coverage, uplink coordinated multipoint (CoMP) reception is employed. In other words, multiple access nodes may coordinate to receive the signals from a wireless device that, due to the frame configuration, is unable to maintain a minimum desired uplink throughput with just one access node. By employing CoMP, the uplink throughput of a wireless device can be improved (in some cases, up to the desired minimum).

Figure 1:
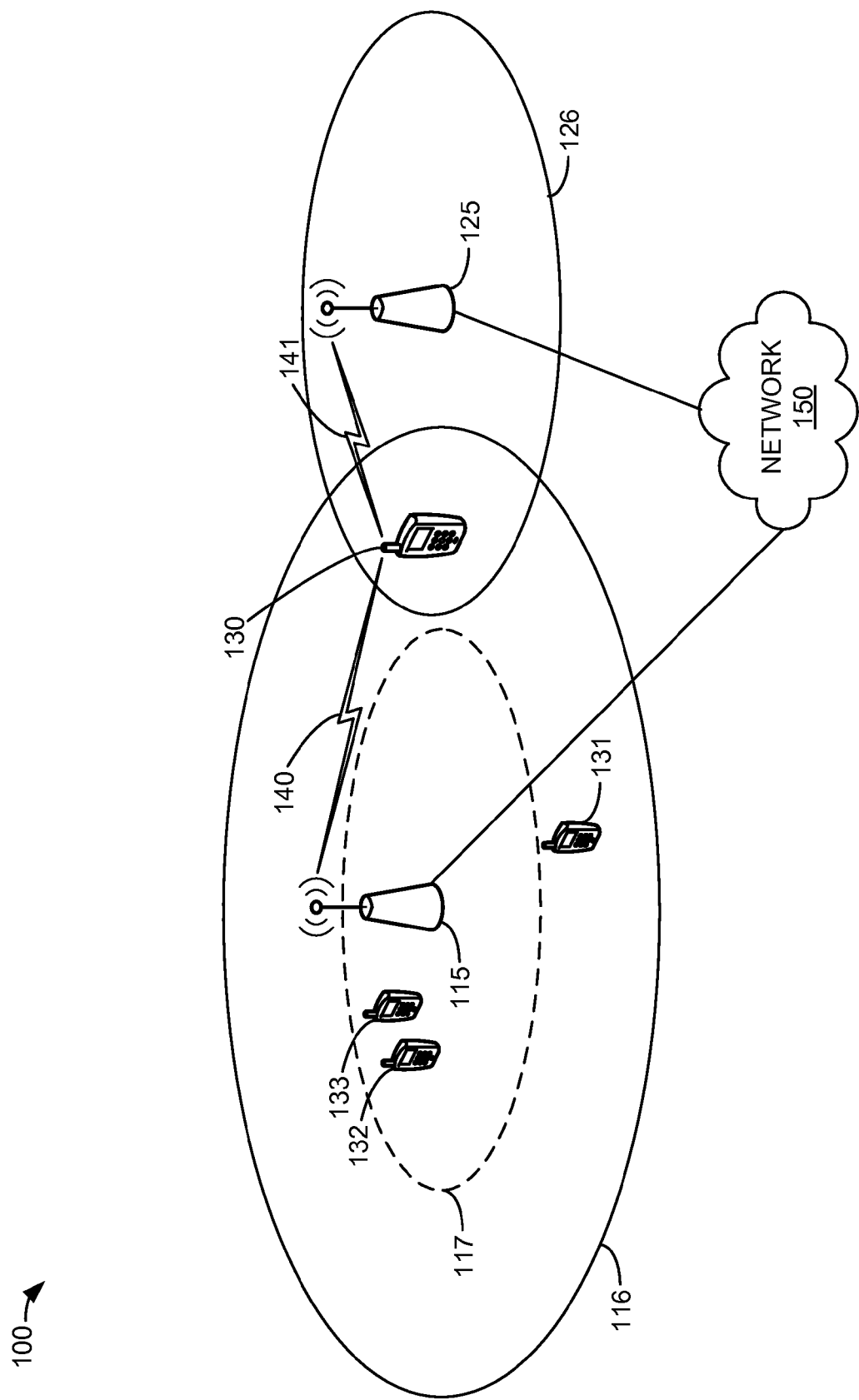
FIG. 1 is a block diagram illustrating a communication system.

FIG. 1 is a block diagram illustrating a communication system. In FIG. 1, communication system 100 comprises access node 115, access node 125, wireless device 130, wireless device 131, wireless device 132, wireless device 133, and network 150. Wireless devices 130-133 can be operatively coupled to access node 115 via a wireless uplinks and wireless downlinks. In particular, wireless device 130 can be operatively coupled to access node 115 via a wireless uplink (e.g., wireless link 140.) Wireless device 130 can also be operatively coupled to access node 125 via a wireless uplink (e.g., wireless link 141.)

Access node 115 is illustrated as having a first air-interface conditions area 116 and a second air-interface conditions area 117. First air-interface conditions area 116 is illustrated as larger than, and encompassing, second air-interface conditions area 117. In FIG. 1, second air-interface conditions area 117 appears as an area that is closer to access node 115. Thus, for example, it may be expected that the air-interface conditions (e.g., uplink throughput, downlink throughput, received signal strength—RSSI, reference signal received power—RSRP, signal to interference and noise ratio—SINR, and/or modulation and coding scheme—MCS) in the second air-interface conditions area 117 are better than the air-interface conditions in the part(s) of the first air-interface conditions area 116 that lie outside the second air-interface conditions area 117.

Access node 125 is illustrated as having air-interface conditions area 126. Air-interface conditions area 126 is illustrated as overlapping first air-interface conditions area 116.

In FIG. 1, wireless device 130 is illustrated within air-interface conditions area 116 and air-interface conditions area 126—but not within air-interface conditions area 117. Wireless device 131 is illustrated within air-interface conditions area 116 but not within air-interface conditions area 117. Wireless device 132 and wireless device 133 are illustrated within air-interface conditions area 116 and within air-interface conditions area 117.

When within air-interface conditions area 116, and when access node 115 is using a first frame configuration, wireless devices 130-133 are able to maintain uplink data communication with access node 115 at a threshold minimum bit rate (a.k.a., bandwidth or throughput). This first frame configuration may have a first ratio of uplink subframes to downlink subframes in each frame. However, when access node 115 is using a second frame configuration, the wireless devices 130-131 that are not within air-interface conditions area 117 are not able to maintain uplink data communication with access node 115 at the threshold minimum bit rate. This second frame configuration may have a second ratio of uplink subframes to downlink subframes in each frame.

Access node 115 and access node 125 are network nodes capable of providing wireless communication to wireless devices 130-133. Access node 115 and/or access node 125 can be, for example, one or more of a base transceiver station, a radio base station, an eNodeB device, or an enhanced eNodeB device. Access node 115 and access node 125 are operatively coupled to network 150. Thus, access node 115 and access node 125 may operatively communicate with each other via network 150.

Communication system 100, and network 150 in particular, is a communication network that can provide wireless communication to wireless devices 130-133. Communication system 100 and can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless uplinks and/or wireless downlinks can be a radio frequency, microwave, infrared, or other similar signal. These wireless uplinks and/or wireless downlinks can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication to/from wireless devices 130-133 but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless devices 130-133 may be any device, system, combination of devices, or other such communication platform capable of communicating wirelessly with access node 115 and access node 125. Wireless devices 130-133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 115 and access node 125. Other types of communication platforms are possible. Wireless devices 130-133, access node 115, and/or access node 125 may be configured to perform one or more steps of the methods illustrated and disclosed herein.

In an embodiment, communication system 100 schedules air-interface resources using a non-linear function of a signal quality indicator (e.g., RSRP). This non-linear function may be based on a scaling factor that is a non-linear function of the signal quality indicator. The scaling factor calculation (i.e., formula) can be selected to help guarantee the average uplink throughput meets a threshold throughput criteria regardless of the frame configuration being used by access node 115. In other words, the scaling factor calculation (and by extension, the priority calculation for the scheduling of air-interface resources) can be weighted to give wireless devices 130-133 which are not able meet the minimum throughput criteria (i.e., threshold minimum bitrate) when access node 115 is using the second frame configuration a greater priority when the first frame configuration is being used.

For example, in FIG. 1, wireless device 130 and wireless device 131 are not able to meet the minimum throughput criteria when the second frame configuration is being used. Thus, when the first frame configuration is being used, communication system 100 (e.g., access node 115) would give wireless device 130 and wireless device 131 higher priority than wireless devices 132-133 (which are always able to meet the minimum throughput criteria regardless of the frame configuration.) Accordingly, the average minimum throughput experienced by wireless device 130 and/or wireless device 131 may be increased. This increase can result in the average throughput experienced by wireless device 130 and/or wireless device 131 meeting the desired minimum throughput criteria.

In a further embodiment, when a wireless device is not able to meet the minimum throughput criteria, and is in range of a second access node (e.g., wireless device 130 is also within range of access node 125), coordinated multipoint (CoMP) reception may be employed. CoMP coordinates between access node 115 and access node 125 to form a virtual antenna array. The signals received from wireless device 130 by access node 115 and access node 125 are combined and processed to produce a higher throughput output. Communication system 100 may be configured to selectively employ CoMP reception when the second frame configuration is being used (or another frame configuration that is causing wireless device 130 to not meet the threshold uplink throughput criteria).

When uplink CoMP is being used, the achieved data rate as a result of using CoMP can be a factor in the scheduling of air-interface resources. In other words, a historical data rate may be a variable input to the scheduling priority associated with a wireless device 130-133. This historical data rate can include the uplink data rate achieved as a result of employing CoMP techniques when a frame configuration is causing a wireless device 130-133 to fail to meet the threshold uplink throughput criteria (i.e., minimum desired bit rate.)

Equation 1 illustrates an example scheduling decision metric for use with communication system 100:

$$\text{Decision Metric} = \frac{CQI}{\left(\frac{R}{\alpha}\right) \times \text{Buf\_stat}}. \qquad \text{Equation 1}$$

In Equation 1, for each respective wireless device 130-133, CQI is a channel quality indicator (e.g., RSRP); buf stat indicates, using a value from 0 to 1, the fullness of the data buffer; R is a historical (e.g., windowed) throughput value; and a is the non-linear scaling factor. The decision metric values from each of wireless devices 130-133 that are in a connected mode to access node 115 can be compared in order to make air-interface scheduling decisions. It should be understood from Equation 1 that a large historical data rate, R, decreases the scheduling priority of a particular wireless device 130-133. A full buffer, (i.e., buf stat approaching 1.0) also decreases the scheduling priority of a particular wireless device 130-133. A good signal quality indicator, CQI, increases the scheduling priority of a particular wireless device 130-133. Finally, a high value for the nonlinear scaling factor, a, increases the scheduling priority of a particular wireless device 130-133 while a low value for a decreases the scheduling priority.

Figure 2:
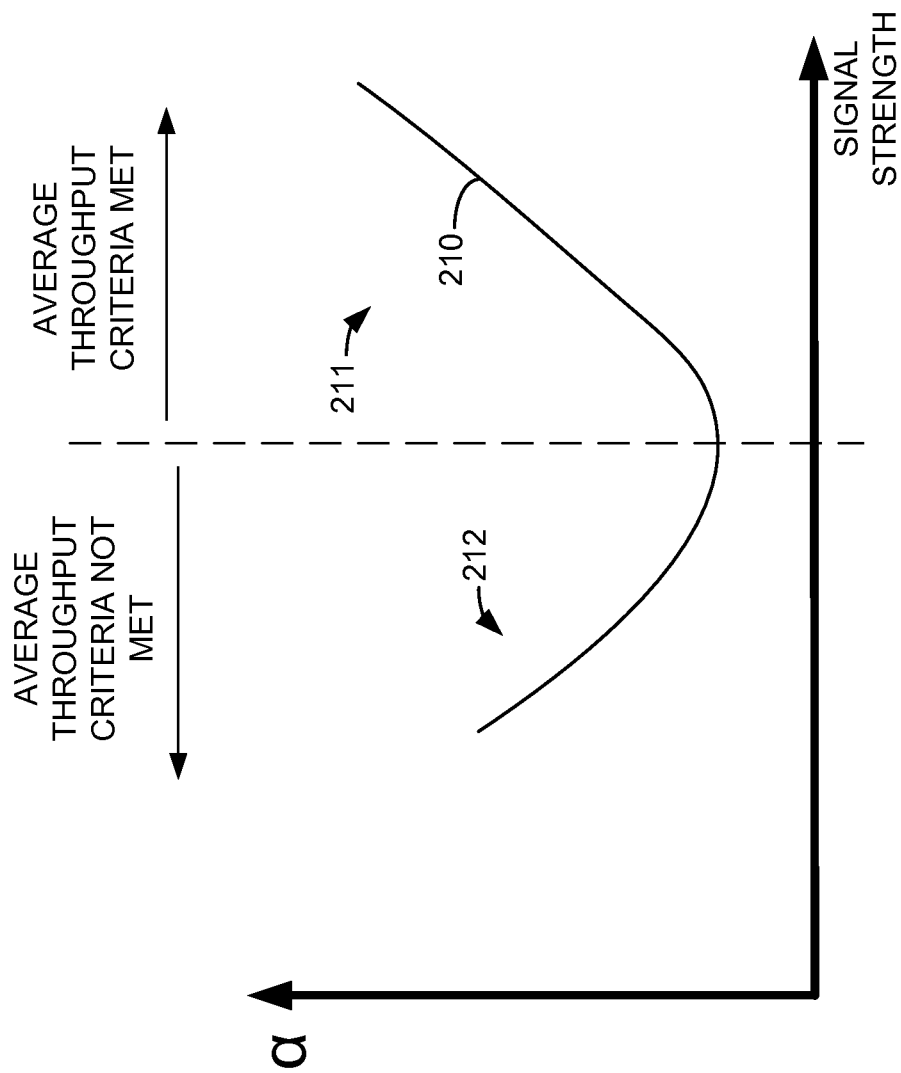
FIG. 2 is an illustration of a nonlinear priority function.

FIG. 2 is an illustration of a nonlinear priority function. The example plot 210 of the scaling factor α illustrated in FIG. 2 may be used in Equation 1 and communication system 100. In FIG. 2, the scaling factor α is illustrated on the vertical axis and increasing signal strength (or other channel quality indicator—e.g., CQI, or RSRP) is illustrated on the horizontal axis. In a first part 212 of the plot 210 α decreases nonlinearly as signal strength increases. This part 212 of the plot 210 is indicated by the reference arrow 212. This part 212 of the plot 210 may correspond to signal strength values which result in the average throughput criteria not being met. This part 212 of the plot 210 may correspond to signal strength values which result in the throughput criteria not being met by certain frame configurations.

In a second part 211 of the plot 210 α increases nonlinearly as signal strength increases. This part 211 of the plot 210 is indicated by the reference arrow 211. This part 211 of the plot 210 may correspond to signal strength values which result in the average throughput criteria being met. This part 211 of the plot 210 may correspond to signal strength values which result in the throughput criteria being met by all or most of the frame configurations used by communication system 100 (and access node 115, in particular.)

In an embodiment, communication system 100 may schedule air-interface resources among wireless device 130-133. This scheduling may use a nonlinear priority function. This nonlinear priority function may use signal quality indicators as part of the scheduling priority. The nonlinear priority function may also be based on historical data rates associated with each wireless device 130-133. The nonlinear priority function may also be based on buffer status indicators associated with each wireless device 130-133. For example, communication system 100 may schedule air-interface resources among wireless device 130-133 using a priority calculation determined by Equation 1.

Communication system 100 may also use access node 115 to communicate with wireless devices 130-133 using a first frame configuration and a second frame configuration. The first frame configuration may have a first number of uplink subframes per frame and the second frame configuration may have a second number of uplink subframes per frame, where the first and second numbers of subframes are not equal.

Communication system 100 may also use coordinated multipoint techniques to receive data from one or more wireless devices 130-133. For example, communication system 100 may use coordinated multipoint reception techniques to receive uplink data from wireless device 130 via access node 115 at a first data rate and via access node 125 at a second data rate. Communication system 100 may calculate a historical data rate to associate with wireless device 130. This historical data rate may be based on (e.g., a summation of) both the first data rate and the second data rate.

Communication system 100 may select a first frame configuration. This first frame configuration may have a first ratio of uplink subframes to downlink subframes. Using access node 115 and the first frame configuration, communication system 100 may communicate with wireless devices 130-133. Using this first frame configuration, access node 115 may be able to meet a desired throughput criteria for each of wireless devices 130-133.

Due to uplink and downlink traffic fluctuations, communication system 100 may select a second frame configuration. This second frame configuration may have a second ratio of uplink subframes to downlink subframes. Using access node 115 and the second frame configuration, communication system 100 may communicate with wireless devices 130-133. However, using this second frame configuration, access node 115 may be able to meet the desired throughput criteria for wireless devices 132-133, but not meet the desired throughput criteria for wireless devices 130-131. Based on the selection of the second frame configuration (which is unable to meet the desired throughput criteria for wireless devices 130-131), communication system 100 may communicate with wireless devices 130-131 using access node 125 concurrently with access node 115 (and using the second frame configuration.) Communication system 100 may communicate with wireless devices 130-131 using access node 125 concurrently with access node 115 by using CoMP techniques.

In addition to using CoMP techniques, communication system 100 may use the nonlinear functions described herein as the basis for setting scheduling priorities among wireless devices 130-133. These nonlinear functions may have as an input, a historical data rate that is based on the data rate achieved by using access node 125 concurrently with access node 115 (and CoMP techniques) to communicate with a particular wireless device (e.g., wireless device 130.)

Figure 3:
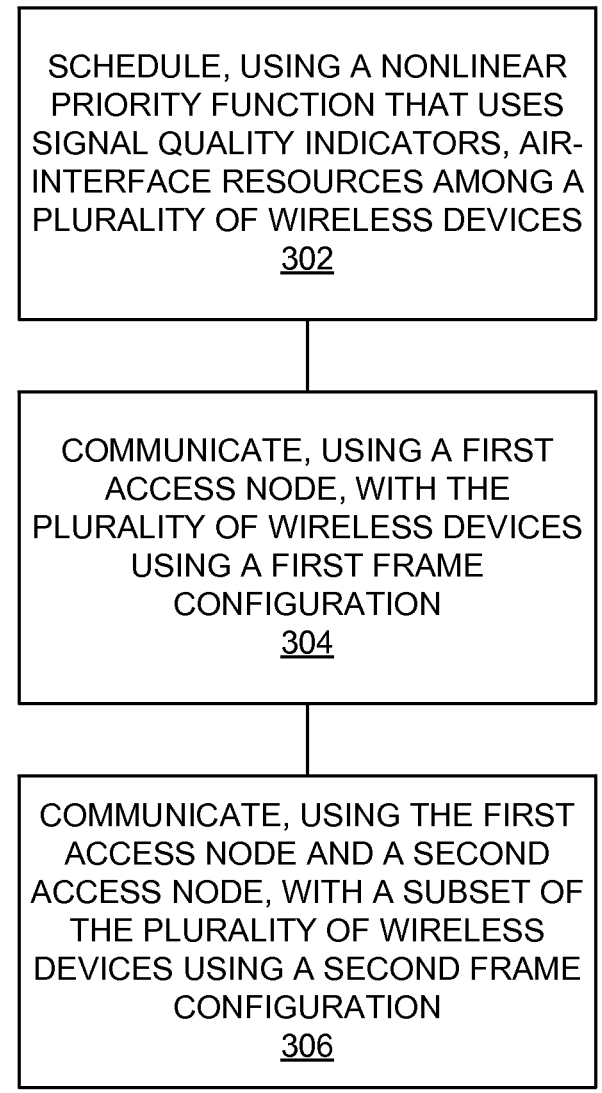
FIG. 3 is a flowchart illustrating a method of operating a communication system.

FIG. 3 is a flowchart illustrating a method of operating a communication system. The steps illustrated in FIG. 3 may be performed by one or more elements of communication system 100. Using a nonlinear priority function that uses signal quality indicators, air-interface resources are scheduled among a plurality of wireless devices (302). For example, access node 115 may schedule air-interface resources among wireless devices 130-133 using the scaling factor α. The scaling factor α may be nonlinearly (e.g., logarithmic, exponential, piecewise linear, etc.) dependent upon a signal quality indicator (e.g., RSRP, CQI, MCS, etc.) as illustrated in FIG. 2. The scheduling priority may be based on Equation 1. The selection of the scaling factor α curve may be designed such that, for some parts of the a curve (e.g., at signal qualities that cause different frame configurations to have different uplink throughputs) a lower signal quality associated with a wireless device 130-133 results in a higher scheduling priority being assigned to that wireless device 130-133.

Using a first access node, communicate with the plurality of wireless devices using a first frame configuration (304). For example, when access node 115 is using a first frame configuration, access node 115 may be able to receive uplink data from wireless devices 130-133 at (at least) a minimum desired throughput. Using a first access node and a second access node, communicate with a subset of the plurality of wireless devices using a second frame configuration (306). For example, when access node 115 is using a second frame configuration, access node 115 may elect to receive uplink data from wireless device 130—using data received via access node 125 to help achieve the minimum desired throughput.

Figure 4:
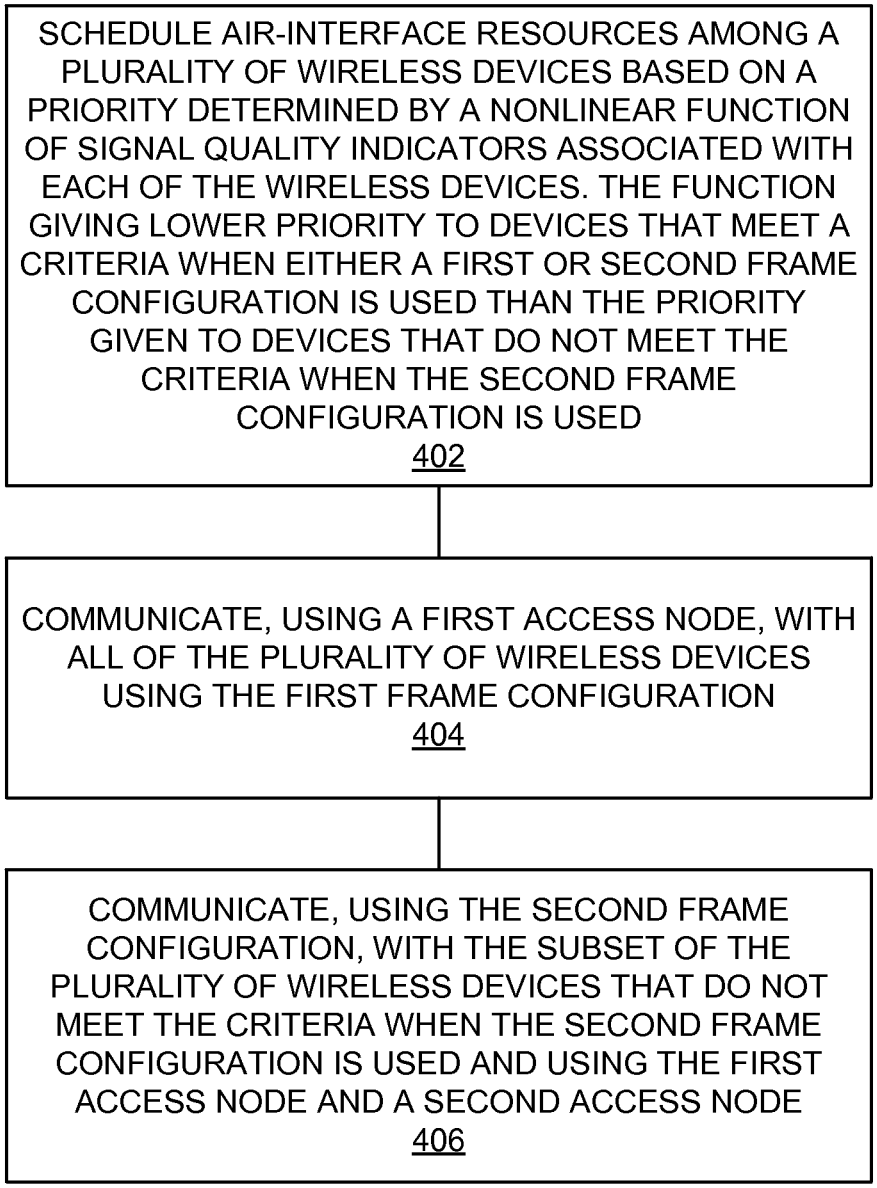
FIG. 4 is a flowchart illustrating a method of communicating with a plurality of wireless devices.

FIG. 4 is a flowchart illustrating a method of communicating with a plurality of wireless devices. The steps illustrated in FIG. 4 may be performed by one or more elements of communication system 100. Air-interface resources are scheduled among a plurality of wireless devices based on a priority determined by a nonlinear function of signal quality indicators associated with each of the wireless devices. The function giving lower priority to devices that meet a criteria when either a first or second frame configuration is used than the priority given to devices that do not meet the criteria when the second frame configuration is used (402). For example, communication system 100 may schedule air-interface resources among wireless devices 130-133. Communication system 100 may schedule air-interface resources among wireless devices 130-133 using priorities determined by Equation 1, described herein. Equation 1 is based on a scaling factor α which may be determined to give higher priority to wireless devices (e.g., wireless device 131) that fail to achieve a desired throughput with some frame configurations.

Using a first access node, all of the plurality of wireless devices are communicated with using the first frame configuration (404). For example, access node 115 may be used to communicate with all of wireless devices 130-133 using a frame configuration which allows all of wireless devices 130-133 to achieve the desired uplink throughput.

Using the second frame configuration, the subset of the plurality of wireless devices that do not meet the criteria when the second frame configuration is used are communicated with using the first access node and the second access node (406). For example, when a frame configuration is used that does not allow one or more of wireless devices (e.g., wireless devices 130-131) to achieve the desired uplink throughput, one or more of those wireless devices 130 may be communicated with using both access node 115 and access node 125. CoMP techniques may be used to combine the uplink data from both access node 115 and access node 125.

Figure 5:
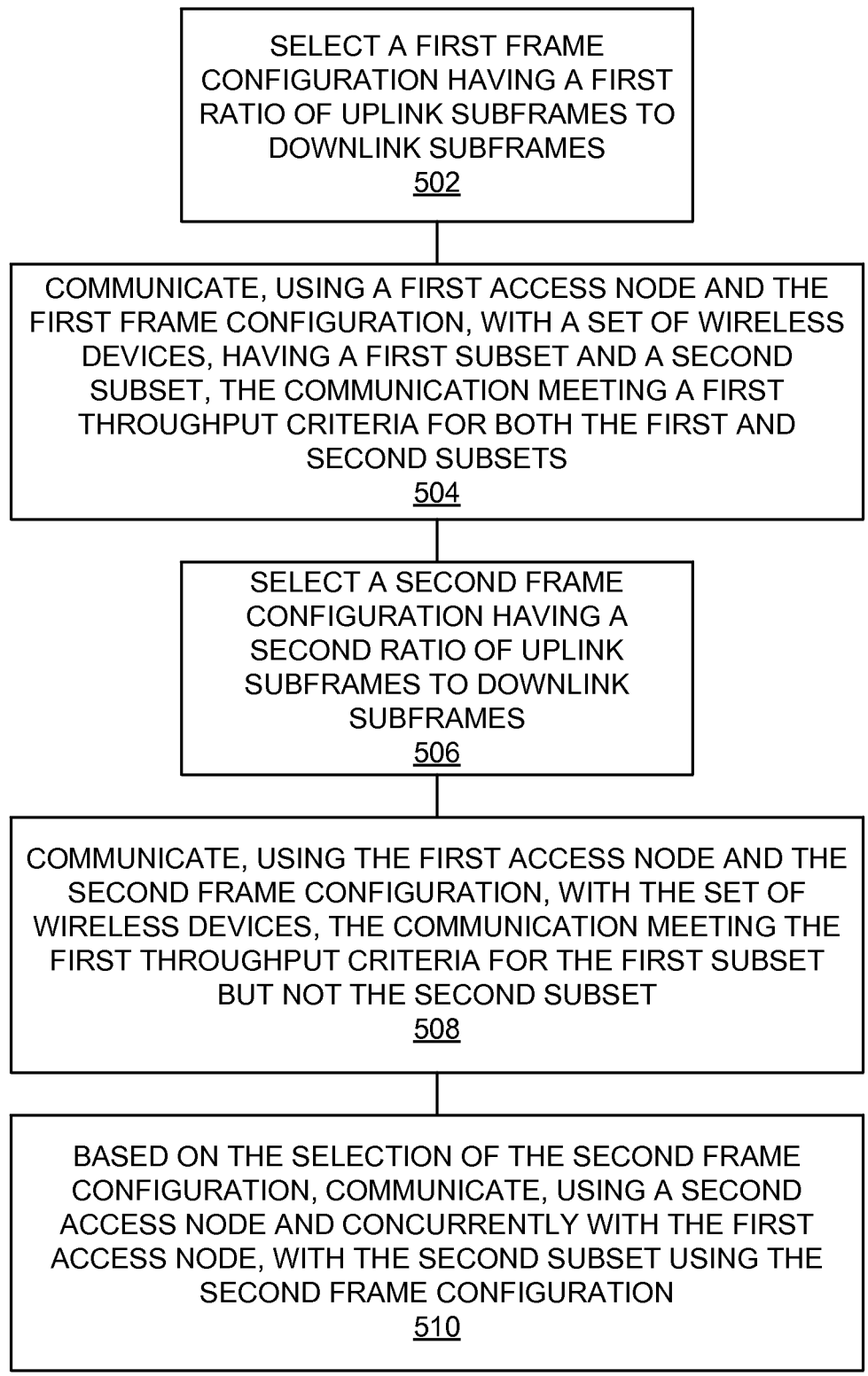
FIG. 5 is a flowchart illustrating a method of communicating using multiple frame configurations.

FIG. 5 is a flowchart illustrating a method of communicating using multiple frame configurations. The steps illustrated in FIG. 5 may be performed by one or more elements of communication system 100. A first frame configuration having a first ratio of uplink subframes to downlink subframes is selected (502). For example, communication system 100 (and access node 115, in particular) may select a frame configuration to use while communicating with wireless devices 130-133. This frame configuration may be selected from a specified set of frame configurations. For example, LTE time-division multiplexing specifies a set of frame configurations given in Table 1. Communication system 100 may select frame configuration #0 given in Table 1. In Table 1, "D" represents a downlink subframe and "U" represents an uplink subframe. Blank entries in the table are a different kind of subframe (e.g., 'guard time' subframes.)

TABLE 1

| Configuration number | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | | U | U | U | D | | U | U | U |
| 1 | D | | U | U | D | D | | U | U | D |
| 2 | D | | U | D | D | D | | U | D | D |
| 3 | D | | U | U | U | D | D | D | D | D |
| 4 | D | | U | U | D | D | D | D | D | D |
| 5 | D | | U | D | D | D | D | D | D | D |
| 6 | D | | U | U | U | D | | U | U | D |

Using a first access node and the first frame configuration, a set of wireless devices having a first subset and a second subset are communicated with. The communication meeting a first throughput criteria for both the first subset and the second subset (504). For example, access node 115 may communicate with wireless devices 130-133. Access node 115 may communicate with wireless devices 130-133 using frame configuration #0 given in Table 1. Access node 115, when it is using the first frame configuration, may be able to receive uplink communication from wireless devices 130-133 at a throughput that meets a desired minimum throughput. However, if access node 115 were to use a second frame configuration, access node 115 may not be able to receive uplink communication from a subset (e.g., wireless device 130) of the wireless devices 130-133 at a throughput that meets a desired minimum throughput.

A second frame configuration having a second ratio of uplink subframes to downlink subframes is selected (506). For example, communication system 100 may select frame configuration #5 given in Table 1. Using the first access node and the second frame configuration, the set of wireless devices are communicated with. The communication meeting the first throughput criteria for the first subset but not the second subset (508). For example, access node 115 may communicate with wireless devices 130-133 using the frame configuration #5 given in Table 1. While using frame configuration #5, access node 115 may be able to receive uplink communication from a subset (e.g., wireless devices 132-133) of the wireless devices 130-133 at a throughput that meets the desired minimum throughput, but is not able to receive uplink communication from another subset (e.g., wireless device 130) at the desired minimum throughput.

Based on the selection of the second frame configuration, and using a second access node concurrently with the first access node, communicate with the second subset using the second frame configuration (510). For example, when the second frame configuration is used, access node 115 and access node 125 may use CoMP techniques to receive communication from wireless device 130.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 115, access node 125, and/or network 150.

Figure 6:
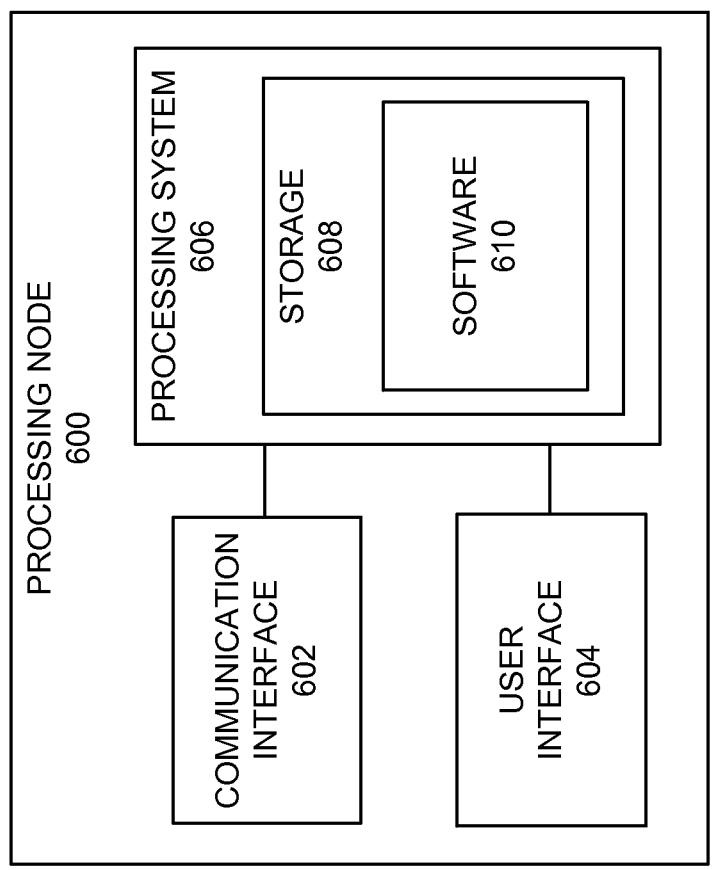
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An example of processing node 600 includes access node 115. Processing node 600 can also be an adjunct or component of a network element, such as an element of access node 115 and/or 125, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   scheduling air-interface resources among a plurality of wireless devices based on a priority determined by a nonlinear function of signal quality indicators associated with each of the plurality of wireless devices, the plurality of wireless devices including a first set of wireless devices and a second set of wireless devices, the nonlinear function giving lower priority to the first set of wireless devices that meet a throughput threshold criteria when both a first frame configuration and a second frame configuration are used, the nonlinear function giving higher priority to the second set of wireless devices that do not meet the throughput threshold criteria when the second frame configuration is used;
   communicating, using a first access node, with the plurality of wireless devices using the first frame configuration; and,
   communicating, using the first access node and a second access node, with the second set of wireless devices using the second frame configuration;
   wherein communicating using the first access node and the second access node includes using coordinated multipoint techniques to receive data from each respective one of the second set of wireless devices at a first data rate using the first access node and at a second data rate using the second access node.

2. The method of claim 1, wherein the priority is also based on a historical data rates associated with each of the plurality of wireless devices.

3. The method of claim 1, wherein the priority is also based on a buffer status indicators associated with each of the plurality of wireless devices.

4. The method of claim 2, wherein the historical data rates associated with each respective one of the second set of wireless devices is based on a respective first data rate and a respective second data rate.

5. The method of claim 1, further comprising:
communicating, using the first access node, with the first set of wireless devices using the second frame configuration.

6. The method of claim 1, wherein first frame configuration has a first number of uplink subframes and the second frame configuration has a second number of uplink subframes, the first number of uplink subframes being not equal to the second number of uplink subframes.

7. A method of operating a communication system, comprising:
selecting a first frame configuration having a first ratio of uplink subframes to downlink subframes;
communicating, using a first access node, with a set of wireless devices using the first frame configuration, the set of wireless devices including a first subset of wireless devices and a second subset of wireless devices, the communicating using the first frame configuration meeting a first throughput threshold criteria for both the first subset of wireless devices and the second subset of wireless devices;
selecting a second frame configuration having a second ratio of uplink subframes to downlink subframes;
communicating, using the first access node, with the set of wireless devices using the second frame configuration, the communicating using the second frame configuration meeting the first throughput threshold criteria for the first subset of wireless devices and not meeting the first throughput threshold criteria for the second subset of wireless devices; and,
based on the selection of the second frame configuration, communicating, using a second access node concurrently with the first access node, with the second subset of wireless devices using the second frame configuration,
wherein communicating using the second access node concurrently with the first access node includes using coordinated multipoint techniques to receive data from one of the second subset of wireless devices at a first data rate using the first access node and at a second data rate using the second access node.

8. The method of claim 7, further comprising:
scheduling air-interface resources among the set of wireless devices based on a priority determined by a nonlinear function of signal quality indicators associated with each of the set of wireless devices.

9. The method of claim 8 wherein the nonlinear function gives higher priority to the second subset of wireless devices than the first subset of wireless devices.

10. The method of claim 8, wherein the nonlinear function gives higher priority to the second subset of wireless devices than the first subset of wireless devices when the first frame configuration is used.

11. The method of claim 8, wherein the priority is also based on an indicator of historical data rates associated with each of the plurality of wireless devices.

12. The method of claim 11, wherein the indicator of historical data rates associated with the one of the second subset of wireless devices is based on both the first data rate and the second data rate.

13. The method of claim 12, wherein the priority is also based on a buffer status indicator associated with each of the set of wireless devices.

14. A communication system comprising:
a first access node configured to communicate with a plurality of wireless devices using a first frame configuration and a second frame configuration, the plurality of wireless devices including a first set of wireless devices and a second set of wireless devices; and,
a second access node configured to communicate with the second set of wireless devices concurrently with the first access node when the second frame configuration is used, a first throughput threshold criteria for each of the second subset of wireless devices not being met by communication with the first access node when the second frame configuration is used,
wherein the first access node and the second access node are configured to communicate with the second set of wireless device using the second access node concurrently with the first access node using coordinated multipoint techniques, and
wherein the first access node receives data from a one of the second set of wireless devices at a first data rate and the second access node receives data from the one of the second set of wireless devices a second data rate.

15. The communication system of claim 14, wherein the first access node is configured to schedule air-interface resources among the plurality of wireless devices based on a nonlinear function of signal quality indicators associated with each of the plurality of wireless devices.

16. The communication system of claim 15, wherein the scheduling of air-interface resources among the plurality of wireless devices is further based on the first data rate and the second data rate.

* * * * *